Sept. 24, 1957  M. M. HENRY  2,807,038
WHEEL RIM CLEANING DEVICE
Filed Aug. 18, 1955  2 Sheets-Sheet 1

INVENTOR.
M. M. Henry
BY Arthur H. Sturges
Attorney

Sept. 24, 1957     M. M. HENRY     2,807,038
WHEEL RIM CLEANING DEVICE

Filed Aug. 18, 1955     2 Sheets-Sheet 2

INVENTOR.
M. M. Henry
BY Arthur H. Sturges,
Attorney

United States Patent Office 2,807,038
Patented Sept. 24, 1957

2,807,038

WHEEL RIM CLEANING DEVICE

Maurice M. Henry, Washington, Iowa

Application August 18, 1955, Serial No. 529,167

3 Claims. (Cl. 15—21)

This invention relates to devices for reconditioning motor vehicle wheel rims particularly in changing over from wheels having tires with inner tubes to tubeless tires where it is necessary to seal all connections through the rims, and in particular a pair of wire buffing wheels mounted on a motor driven power shaft and positioned to engage flat surfaces of rims of wheels with the wheels carried by a counter-shaft rotatably mounted in a bearing stand extended from a base upon which the power shaft and motor thereof are mounted, and wherein the counter-shaft is rotated from the power shaft at a speed less than that of the power shaft.

The purpose of this invention is to provide mechanical means for cleaning rims of motor vehicle wheels preparatory to mounting tubeless tires thereon.

In repairing and replacing tires of motor vehicles it is desirable to remove rust, corrosion, and other debris, such as gummy rubber usually accumulated on the tire engaging surfaces of the rims preparatory to mounting new tires thereon. This is particularly true when conventional tires are being replaced with tubeless tires wherein all tire engaging surfaces must be sealed. With these thoughts in mind this invention contemplates a pair of wire buffing wheels mounted on a motor driven shaft and positioned to be engaged by peripheral surfaces of rims on a counter-shaft parallel to the motor driven shaft and driven thereby.

The object of this invention is, therefore, to provide a machine for cleaning rims of motor vehicle wheels in which the rims may readily be mounted on the machine and also readily removed therefrom.

Another object of the invention is to provide a machine for cleaning rims of motor vehicle wheels in which the parts are readily adjusted to wheels of different sizes.

Another important object of the invention is to provide a machine having wire buffing wheels for cleaning rims of motor vehicle wheels in which the wire buffing wheels are adapted to be fed into the rims with a screw feed.

A further object of the invention is to provide a machine having wire buffing wheels for cleaning rims of motor vehicle wheels in which the rims are adapted to be rotated at a speed less than that of the buffing wheels.

A still further object of the invention is to provide a machine for cleaning corrosion, rust, and other debris from rims and flanges of motor vehicle wheels in which the machine is of a simple and economical construction.

With these and other objects and advantages in view the invention embodies a base plate, a carriage mounted to travel transversely of the base plate, a motor positioned on the carriage, buffing wheels carried by a power shaft rotatably mounted on the carriage and connected by a coupling to a shaft of the motor, a bearing stand mounted on the base plate, a counter-shaft rotatably mounted in the bearing stand, means for mounting the rim of a wheel on the counter-shaft, and a belt trained over pulleys on the power shaft and counter-shaft whereby the counter-shaft is rotated from the power shaft.

Other features and advantages of the invention will appear from the following description taken in connection with the drawings, wherein.

Figure 1:
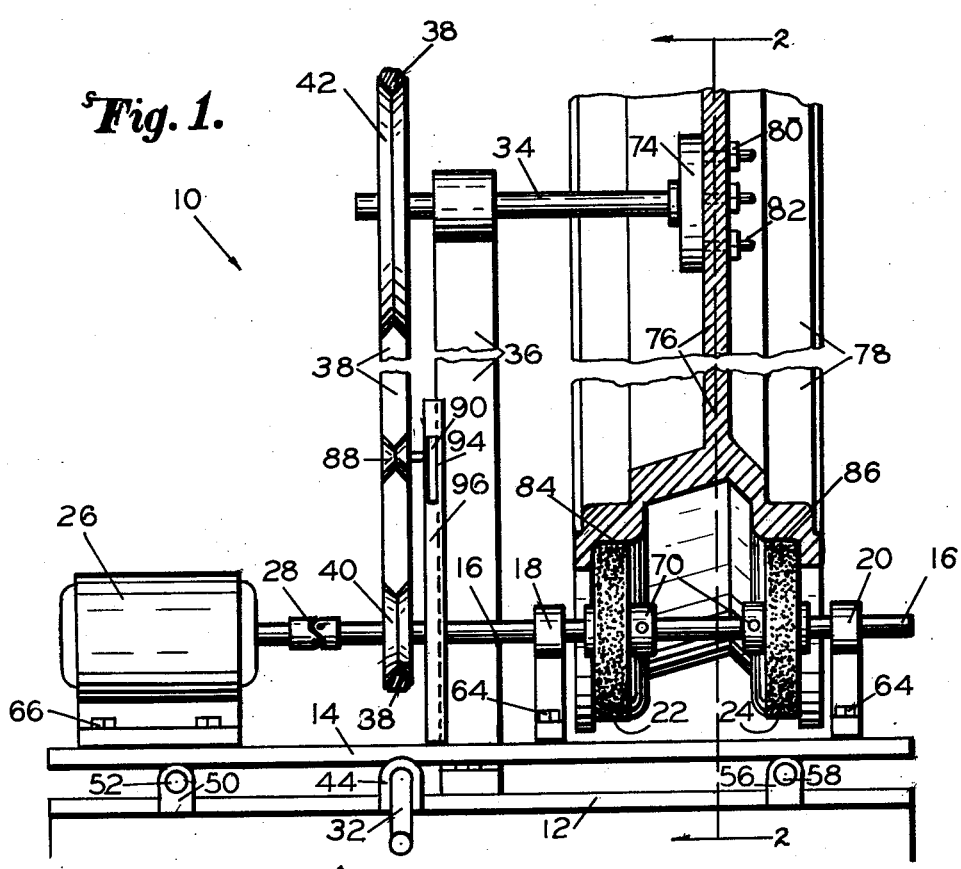
Figure 1 is a side elevational view of the improved wheel rim cleaning machine, with the rim of a wheel in operative position on the machine, shown in section.

While one embodiment of the invention is illustrated in the above-referred-to drawings, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout and in which the numeral 10 refers to the invention in its entirety, numeral 12 indicating a base plate, numeral 14 an elongated plate providing a carriage, numeral 16 a power shaft rotatably mounted in bearings 18 and 20 positioned on the carriage, numerals 22 and 24 wire buffing wheels carried by the power shaft, numeral 26 a motor operatively connected to the power shaft with a coupling 28, numeral 30 a threaded rod actuated by a hand crank 32 for adjusting the position of the carriage on the base plate, and numeral 34 a counter-shaft rotatably mounted in a bearing stand 36 and rotated from the power shaft with a belt 38 trained over pulleys 40 and 42 on the power shaft and counter-shaft, respectively.

The base plate 12, which is adapted to be positioned on a work bench, table, or the like, is provided with tabs or bearing plates 44 and 46 in which the rod 30 is rotatably mounted, tabs 48 and 50 in which a guide rod 52 is mounted, and tabs 54 and 56 in which a guide rod 58 is mounted. The carriage 14 is provided with internally threaded lugs 60 and 62 through which the rod 30 is threaded and similar lugs, which are positioned to receive the guide rods 52 and 58, also extend downwardly from the under surface of the carriage. The bearings 18 and 20 are secured to the carriage with bolts 64, and the motor is also secured to the carriage by bolts 66. The wire buffing wheels are secured to the power shaft 16 with set screws 68 that are threaded in hubs 70 of the wheels.

The bearing stand 36 is secured to the base plate 12 with bolts 72, and the extended end of the counter-shaft 34 is provided with a flange 74 to which a web 76 of a rim 78 may be secured by nuts 80 threaded on studs 82. The counter-shaft is positioned parallel to the power shaft and with the wire buffing wheels positioned as shown, flat surfaces 84 and 86 may readily be cleaned by rotating the rim slowly and the buffing wheels at a comparatively high speed. With the diameter of the pulley 40 less than that of the pulley 42 the speed of the counter-shaft 34 is less than that of the power shaft 16 and by changing the sizes of the pulleys the speed ratio may be changed as desired.

Figure 2:
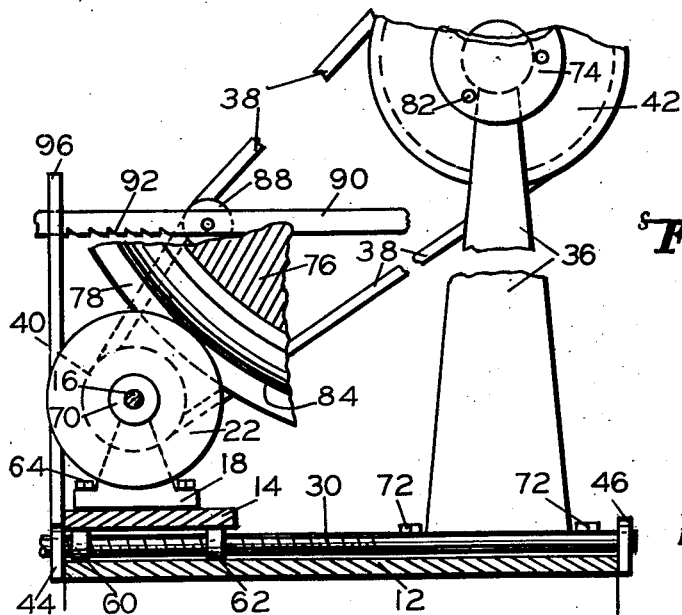
Figure 2 is a cross section through the machine taken on line 2—2 of Figure 1, with parts broken away.
Figure 3:
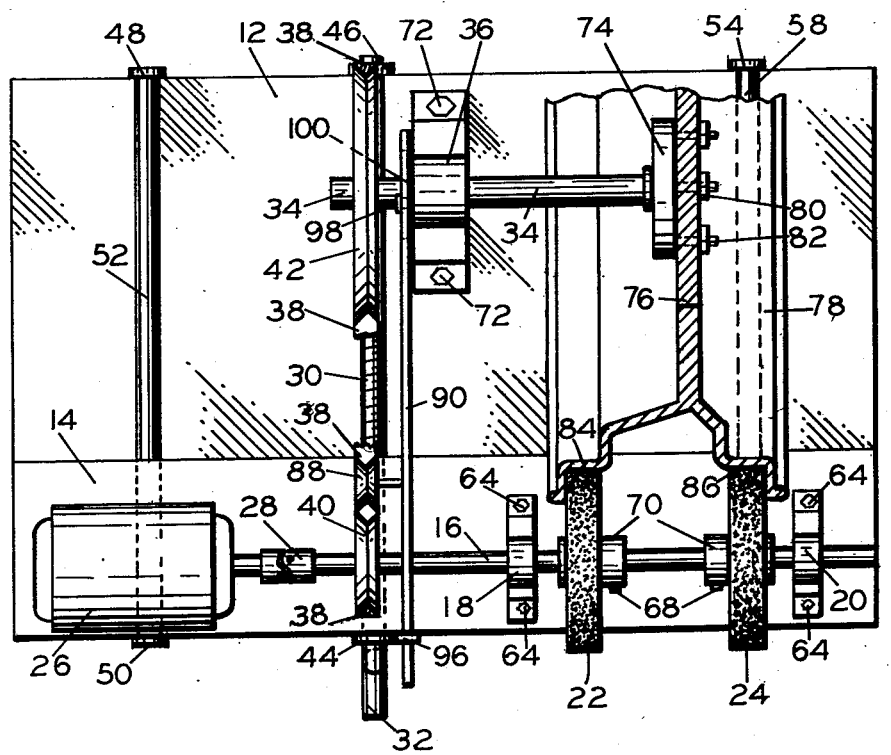
Figure 3 is a plan view of the machine also with a rim of a wheel shown in section, and positioned thereon.

The belt 38 is retained in tension by an idler pulley 88 rotatably mounted on a bar 90, having teeth 92 in the lower edge, and the teeth are positioned to latch over the lower edge of a slot 94 in a post 96 mounted on and extended upwardly from the carriage 14, as shown in Figure 2. The opposite end of the bar 90 is positioned on a stud 98 having a head to prevent accidental displacement of the bar from the stud, the stud being positioned in an elongated slot 100 in the bar.

Operation

With the parts assembled as shown and described a wheel is secured on the studs of the flange 74 of the counter-shaft 34 and with the wire buffing wheels 22 and 24 positioned to contact the flat surfaces of the rim of the wheel the motor is started whereby the buffing wheels rotate at a relatively high speed and the wheel at a comparatively low speed so that the outer surface of the rim is subjected to the action of the buffing wheels. The relative positions of the buffing wheels and rim are adjusted whereby a light or heavy cleaning action is obtained and by manipulation of the buffing wheels and rim the complete surface of the rim may be thoroughly cleaned.

By adjusting the position of the bar 90 to relieve tension in the belt 38 the rim may be held stationary or may be fed to the buffing wheels by hand when a relatively slow motion is desired.

From the foregoing specification it will become apparent that the invention disclosed will adequately accomplish the functions for which it has been designed and in an economical manner and that its simplicity, accuracy, and ease of operation are such as to provide a relatively inexpensive device considering what it will accomplish, and that it will find an important place in the art to which it appertains when once placed on the market.

It is thought that persons skilled in the art to which the invention relates wil be able to obtain a clear understanding of the invention after considering the description in conjunction with the drawings. Therefore, a more lengthy description is regarded as unnecessary.

Changes in shape, size and rearrangement of details and parts, such as come within the purview of the invention claimed may be resorted to in actual practice, if desired.

Having now described the invention that which is claimed to be new and desired to be procured by Letters Patent, is:

1. A motor vehicle wheel rim cleaning machine comprising, a base, a carriage slidably mounted on the base, a feed screw having a hand crank on one end mounted on the base end operatively connected to the carriage for adjusting the position of the carriage on the base, a shaft rotatably mounted on the carriage, wire buffing wheels adjustably mounted on the shaft, a motor mounted on the carriage and operatively connected to the shaft on which the buffing wheels are mounted, a bearing stand mounted on the base, means for mounting a wheel in the bearing stand with the rim of the wheel positioned to be engaged by the buffing wheels, and means for rotating the wheel mounted in the bearing stand by the shaft with the wheel rotating at a speed less than that of the buffing wheels.

2. In a motor vehicle wheel rim cleaning machine, the combination which comprises a base, a carriage mounted to slide transversely of the base, a screw feed for adjusting the position of the carriage on the base, a motor driven power shaft rotatably mounted on the carriage, spaced wire buffing wheels positioned on the power shaft, a bearing stand positioned on the base, a counter-shaft rotatably mounted in the bearing stand, and a belt trained over pulleys on the power shaft and counter-shaft for rotating the counter-shaft, said counter shaft having means thereon for mounting a wheel and said bearing stand being positioned whereby the rim of the wheel is adapted to be engaged by said buffing wheels.

3. In a wheel rim cleaning machine, the combination which comprises a base, a carriage positioned above the base, means for slidably mounting the carriage on the base, means for adjusting the position of the carriage on the base, a bearing stand mounted on the base, a power shaft rotatably mounted on the carriage, a motor mounted on the carriage and operatively connected to the power shaft, buffing wheels mounted on the power shaft, a counter-shaft rotatably mounted in the bearing stand, aligned pulleys on the power shaft and counter-shaft, a belt trained over said pulleys, the diameter of the pulley on the counter-shaft being greater than that of the pulley on the power shaft, means for adjusting tension of said belt, and means on the counter-shaft for mounting a wheel with the rim thereof positioned to be engaged by said buffing wheels.

References Cited in the file of this patent
UNITED STATES PATENTS

| | | |
|---|---|---|
| 1,489,922 | Brundage | Apr. 8, 1924 |
| 2,023,347 | Valkenburgh | Dec. 3, 1935 |
| 2,150,462 | Schultz et al. | Mar. 14, 1939 |
| 2,243,461 | Haskins | May 27, 1941 |
| 2,333,599 | Terry | Nov. 2, 1943 |